June 10, 1924.　　　　　　　　　　　　　　　1,496,984

G. FELSCH

CUTTING TOOL

Filed Feb. 3, 1922

Witnesses:

Inventor:
Georg Felsch
by Franz Reinhardt
Attorney.

Patented June 10, 1924.

1,496,984

UNITED STATES PATENT OFFICE.

GEORG FELSCH, OF NEUKOLLN, NEAR BERLIN, GERMANY.

CUTTING TOOL.

Application filed February 3, 1922. Serial No. 533,921.

*To all whom it may concern:*

Be it known that I, GEORG FELSCH, a citizen of Germany, residing at Neukolln, near Berlin, Germany, have invented certain new and useful Improvements in Cutting Tools; and I do hereby declare the following to be a full, clear, and exact description of the invention, such as will enable others, skilled in the art to which it appertains, to make and use the same.

My invention relates to improvements in cutting tools adapted for turning, thread-cutting, or any other metal work of a similar nature, and more particularly in tools of the type comprising a shank having a prismatic cutting member removably or adjustably secured thereto. One of the objects of the improvements is to provide a tool of this type in which the cutting member is securely held in position on the shank, and which is simple in construction. Another object of the improvements is to provide a cutting member which can be mounted on the shank so as to present either one of a plurality of cutting edges in cutting position. With these and other objects in view my invention consists in the matters to be described hereinafter and particularly pointed out in the appended claims.

For the purpose of explaining the invention several examples embodying the same have been shown in the accompanying drawing in which the same reference characters have been used in all the views to indicate corresponding parts. In said drawing,—

In the example shown in Figs. 1 to 4 my improved tool comprises a shank $a$ adapted to be held in a tool post or any other tool holding device of a lathe, planer, shaper or any other metal working machine, and provided at its front end with a clamping member $b$ bearing on the shank at its rear end and adapted to be forced into clamping engagement with a cutting member $s$ by a screw $c$. The shank and clamping members are inclined downward and rearward at their front faces, so that the cutting member is clamped thereon in inclined position.

Figure 1:
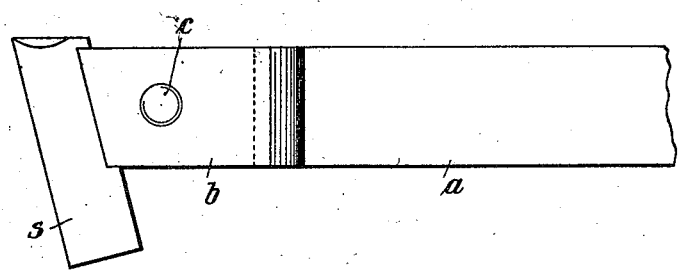
Fig. 1, is a side view of the tool.
Figure 3:
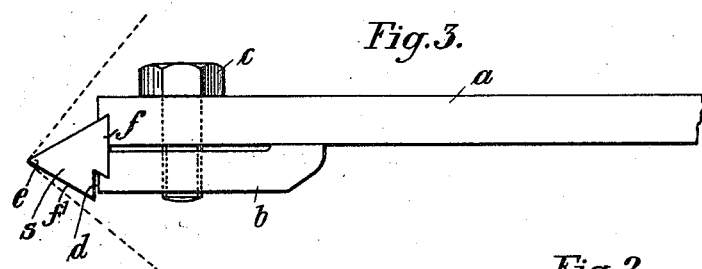
Fig. 3, is a plan view of Fig. 1.
Figure 4:
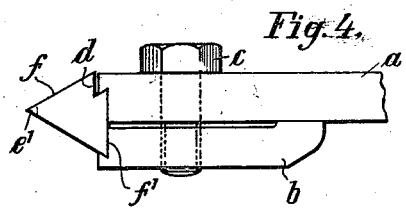
Fig. 4, is a plan view of the tool showing the cutting member in a position different from that shown in Fig. 3, and Fig. 5, is a cross-section showing a modification of the cutting member.
Figure 2:
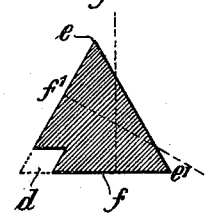
Fig. 2, is a cross-section on an enlarged scale of the cutting member.

As shown the cutting member is substantially in the form of a triangular prism having a longitudinal V-shaped cut-out portion $d$ at one corner providing two shoulders which are respectively parallel to the adjacent sides of the prism. Thereby two clamping shoes including respectively the faces $f$ and $f^1$ are formed on the cutting member which fit between corresponding dove-tailed clamping jaws provided at the front ends of the shank $a$ and clamping member $b$. By thus providing clamping shoes which are located at one side of the cutting member the breadth of the holder consisting of the shank $a$ and clamping member $b$ is reduced, and the cutting edges $e$ and $e^1$ are shifted sidewise relatively to the shank, said edges being disposed laterally of the perpendicular lines passing through the middles of the bases of the clamping shoes, which lines have been indicated in Fig. 2 in dotted lines. Figs. 3 and 4 show that in the assembled tool the cutting edges are shifted either to the right or to the left from the longitudinal axis of the holder provided by the shank $a$ and clamping member $b$. By my improved construction I am enabled to use the tool for cutting blanks having projecting flanges or the like which are disposed relatively to the body of the blank at angles of 90 degrees or less, as appears from the dotted lines shown in Fig. 3, for which purpose the shank is fixed in the tool post more or less at an angle to the blank.

Figure 5:
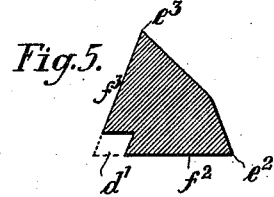

It will be understood that my invention is not limited to a construction in which the cutting member is exactly triangular in cross-section. In some cases I prefer a member which more or less departs from the triangular form. In Fig. 5 I have shown a modification in which the face of the prism which is opposite to the cut-out portion $d^1$ is curved outwards. This construction is preferred for example in such cases in which one of the cutting edges $e^2$ or $e^3$ is located sidewise and away from the perpendicular line passing through the middle of the opposite side of the triangle, or in which it is desired to provide a particularly strong cutting member.

While in describing the invention reference has been made to particular examples embodying the same, I wish it to be understood, that my invention is not limited to the constructions shown in the drawing, and that various changes may be made in the construction of the tool without departing from the invention.

I claim:

1. A tool, comprising a prismatic cutting member formed with a plurality of cutting edges and with a plurality of pairs of clamping shoulders, the shoulders of each pair including with the side face intermediate the same acute angles, and a holder adapted for clamping engagement with either one of said pairs of clamping shoulders.

2. A tool, comprising a prismatic cutting member substantially triangular in cross-section and formed with a plurality of cutting edges and with a plurality of pairs of clamping shoulders, the shoulders of each pair including with the side face intermediate the same acute angles and the cutting edges being disposed each laterally of the longitudinal perpendicular plane passing through the middle of the side face opposite the cutting edge, and a holder adapted for clamping engagement with either one of said pairs of clamping shoulders.

3. A tool comprising a prismatic cutting member formed with a plurality of cutting edges and having one corner cut-out longitudinally so as to provide two clamping shoulders each forming with a side face at the adjacent corner of the member a pair of clamping surfaces, and a holder adapted for clamping engagement with either one of the pairs of clamping surfaces.

4. A tool comprising a prismatic cutting member formed with a plurality of cutting edges and having one corner cut out longitudinally so as to provide two clamping shoulders each forming with a side face at the adjacent corner of the member a pair of clamping surfaces, the clamping surfaces of each pair including with the face intermediate the same acute angles, and a holder adapted for clamping engagement with either one of the pairs of clamping surfaces.

5. A tool comprising a prismatic cutting member approximately triangular in cross-section formed with a plurality of cutting edges and having one corner cut out longitudinally so as to provide two clamping shoulders each forming with a side face at the adjacent corner of the member a pair of clamping surfaces, the cutting edges being disposed each laterally of the longitudinal perpendicular plane passing through the middle of the side face opposite the cutting edge, and a holder adapted for clamping engagement with either one of said pairs of clamping faces.

In testimony whereof I hereunto affix my signature in the presence of two witnesses.

GEORG FELSCH.

Witnesses:
E. HOLTZMANN,
CHARLES DURRILL.